(12) United States Patent
Sprangle et al.

(10) Patent No.: US 7,984,273 B2
(45) Date of Patent: Jul. 19, 2011

(54) SYSTEM AND METHOD FOR USING A MASK REGISTER TO TRACK PROGRESS OF GATHERING ELEMENTS FROM MEMORY

(75) Inventors: Eric Sprangle, Austin, TX (US); Anwar Rohillah, Austin, TX (US); Robert Cavin, San Francisco, CA (US); Tom Forsyth, Kirkland, WA (US); Michael Abrash, Kirkland, WA (US)

(73) Assignees: Intel Corporation, Santa Clara, CA (US); Tom Forsyth, Kirkland, WA (US); Michael Abrash, Kirkland, WA (US)

( * ) Notice: Subject to any disclaimer, the term of this patent is extended or adjusted under 35 U.S.C. 154(b) by 554 days.

(21) Appl. No.: 11/967,482

(22) Filed: Dec. 31, 2007
(Under 37 CFR 1.47)

(65) Prior Publication Data
US 2009/0172364 A1    Jul. 2, 2009

(51) Int. Cl.
*G06F 9/312*    (2006.01)
(52) U.S. Cl. .............................. 712/225; 712/4; 712/6
(58) Field of Classification Search ............... 712/2, 4, 712/5, 6, 7, 220, 225, 228, 244
See application file for complete search history.

(56) References Cited

U.S. PATENT DOCUMENTS

| | | | | |
|---|---|---|---|---|
| 4,745,547 A | * | 5/1988 | Buchholz et al. ................ | 712/4 |
| 5,511,210 A | * | 4/1996 | Nishikawa et al. ............... | 712/5 |
| 2005/0114632 A1 | | 5/2005 | Kottapalli | |

OTHER PUBLICATIONS

IBM Technical Disclosure Bulletin NN8206121, "Interruption Scheme for Vector instructions", Jun. 1, 1982, pp. 121-123.*
IBM, "IBM System/370 Vector Operations", Aug. 1986, pp. 2-20 to 2-25 & 3-16.*
AMD64 Technology 128-Bit SSE5 Instruction Set, Publication No. 43479, Revision 3.01, Aug. 2007 pp. 3, 4, 9, and 39-41.
David Tanqeray, The Cray X1 and Supercomputer Roadmap, Dec. 2002, pp. 7 & 18.
Espasa et al., "Tarantula: a vector extension to the aplha architecture", Proceedings of the 29th annual international symposium on Computer architecture ©2002 (ISCA '02), vol. 30, Issue 2, May 2002, pp. 281-292.

* cited by examiner

*Primary Examiner* — David J Huisman

(57) ABSTRACT

A system and method for assigning values to elements in a first register, where each data field in a first register corresponds to a data element to be written into a second register, and where for each data field in the first register, a first value may indicate that the corresponding data element has not been written into the second register and a second value indicates that the corresponding data element has been written into the second register, reading the values of each of the data fields in the first register, and for each data field in the first register having the first value, gathering the corresponding data element and writing the corresponding data element into the second register, and changing the value of the data field in the first register from the first value to the second value. Other embodiments are described and claimed.

17 Claims, 5 Drawing Sheets in the art that the present invention may be practiced without these specific details. In other instances, well-known methods, procedures, components and circuits have not been described in detail so as not to obscure the present invention.

SYSTEM AND METHOD FOR USING A MASK REGISTER TO TRACK PROGRESS OF GATHERING ELEMENTS FROM MEMORY

BACKGROUND OF THE INVENTION

Porting an application or software code may include changing the original source code of the application to make the application compile, install, and/or run on specific systems or architectures, such as for example, a wide or large width vector architecture. For such applications, memory access algorithms to the original source code, when ported to target code, may be complex, inconsistent, or noncontiguous, for example, as vector widths increase (e.g., for operations such as three dimensional (3D) image rendering). Memory used for processes, for example, run on a ported application may be stored in noncontiguous or non-adjacent memory locations.

Mechanisms for improving memory access may include implementing gathering and scattering operations for generating local contiguous memory access for data from other non-local and/or noncontiguous memory locations. Gather operations may collect data from a set of noncontiguous or random memory locations in a storage device and combine the disparate data into a packed structure. Scatter operations may disperse elements in a packed structure to a set of noncontiguous or random memory locations.

If gather operations are interrupted, with some architectures, using ported code, the state of the machine may not be saved, requiring a repeat of the entire gather operation rather than a restart where the gather operation was interrupted.

A need exists for implementing a more efficient mechanism for collecting or gathering elements from memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
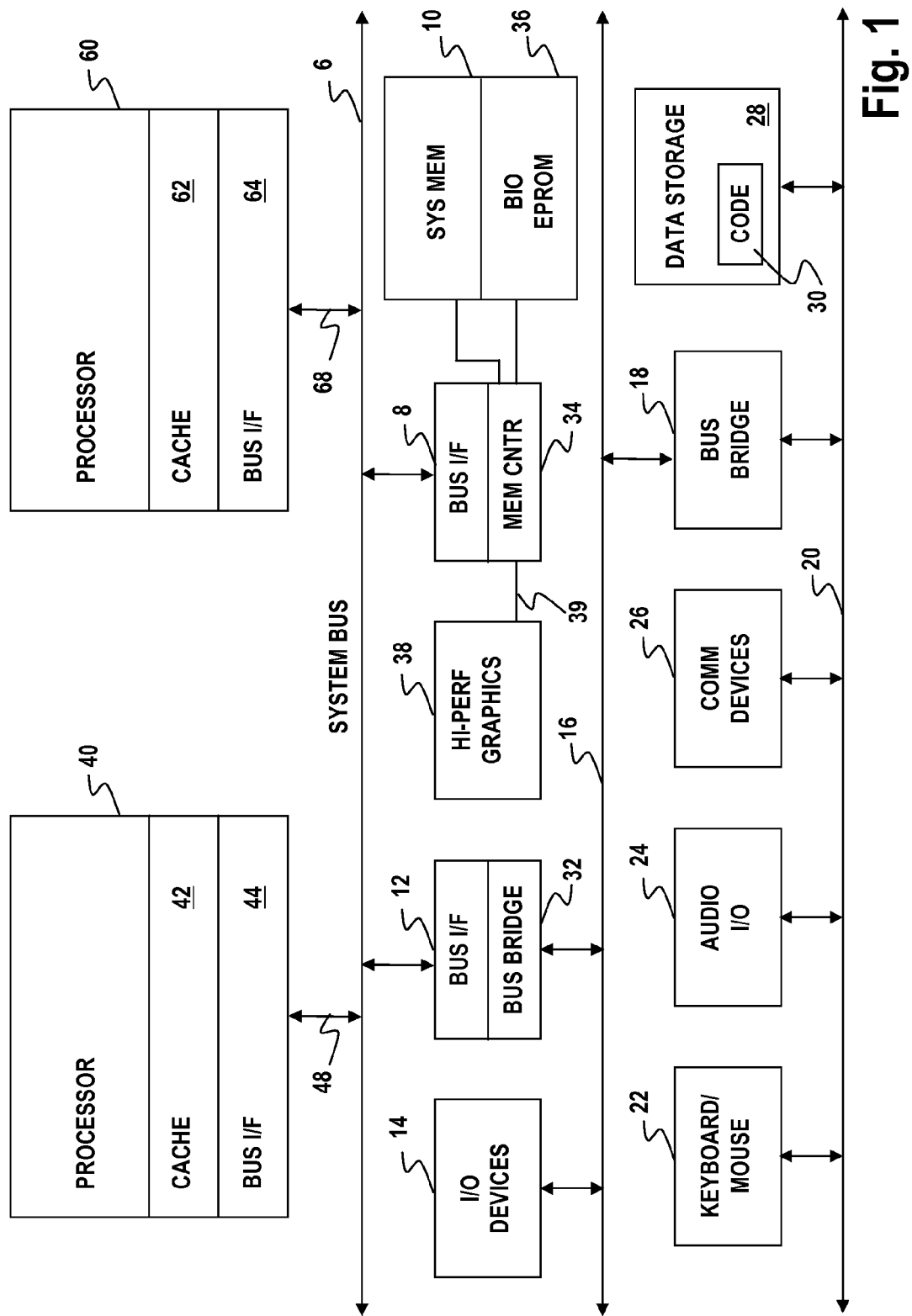
FIGS. 1 and 2 are schematic illustrations of computing systems according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers (PCs), wireless devices or stations, video or digital game devices or systems, image collection, processing, generation, and/or visualizing systems or display, digital display system, communication system, and the like.

Figure 2:
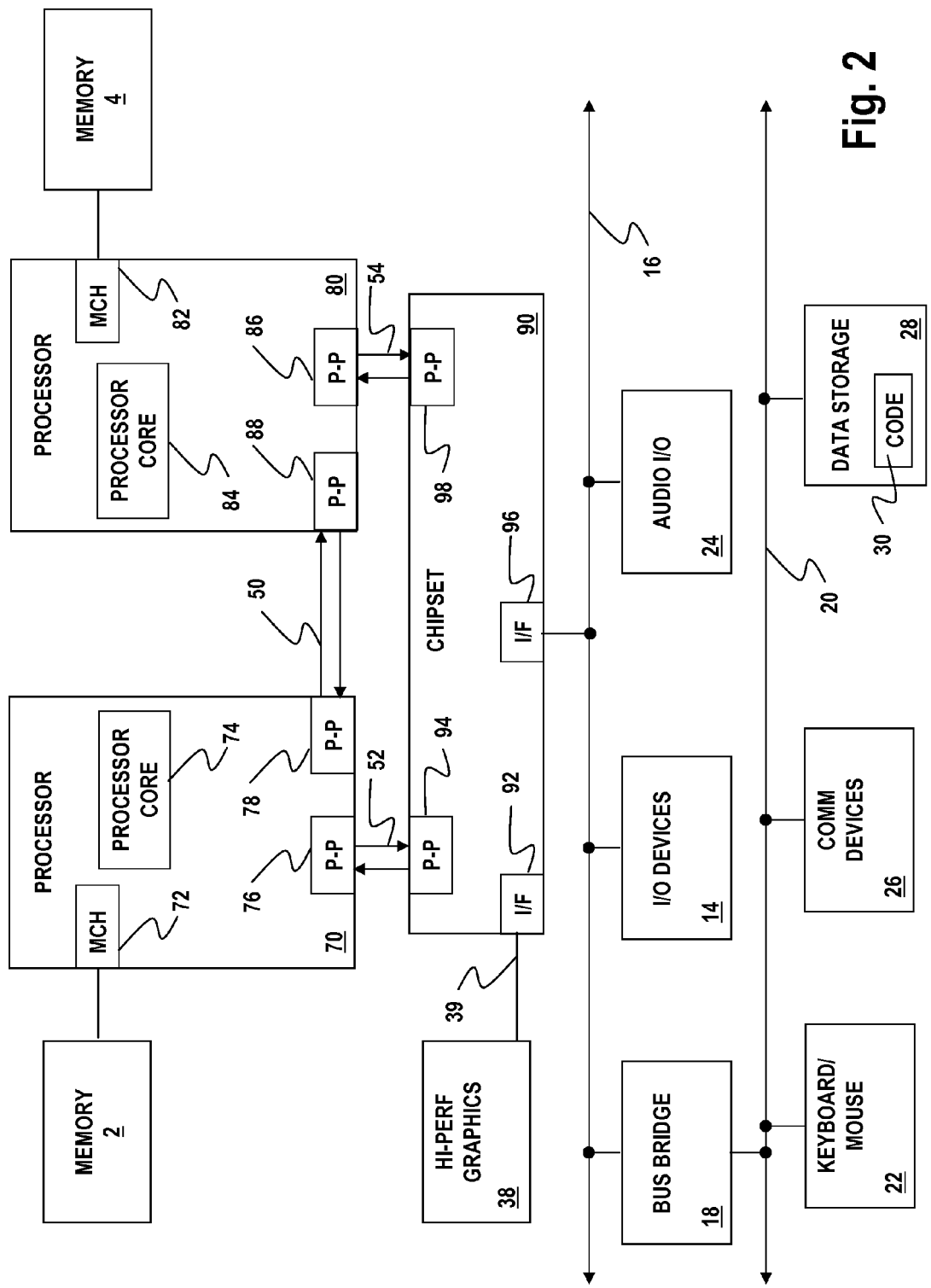

Reference is made to FIGS. 1 and 2, which schematically illustrate computing systems according to embodiments of the invention. The system in FIG. 1 shows a system where processors, memory, and input/output devices are interconnected by a front side bus and/or a system bus, whereas system in FIG. 2 shows a system were processors, memory, and input/output devices are interconnected by a number of point-to-point interfaces. Other processor architectures may be used, and other methods of communicating data within a processor may be used. Other numbers of processors than shown may be used, such as one.

The system in FIG. 1 may include several processors, of which only two, processors 40 and 60 are shown for clarity. In other embodiments only one processor may be used. Processors 40 and 60 may include level one caches 42, 62, for example, for gathering or scattering data. The system in FIG. 2 may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other buses may be used.

Memory controller 34 may permit processors 40, 60 to read, write, gather and/or scatter data to and from system memory 10 and from a basic input/output system (BIOS) erasable programmable read-only memory (EPROM) 36. Other components may perform such functions, such as gather functions, and other internal and external memories may be used. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

The system in FIG. 2 may also include several processors, of which only two, processors 70, 80 are shown for clarity. Processors 70, 80 may each include a local memory channel hub (MCH) 72, 82 to connect with memory 2, 4, for example, for gathering and/or scattering data. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 1 system, bus bridge 32 may permit data exchanges between system bus 6 and bus 16, which may in some embodiments be an industry-standard architecture (ISA) bus or a peripheral component interconnect (PCI) bus. In the FIG. 2 system, chipset 90 may exchange data with a bus 16 via a bus interface 96. In either system, there may be various input/output I/O devices 14 on the bus 16. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include for example keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

Embodiments of the invention may include a computer readable medium, such as for example a memory, a disk drive, or a universal serial bus (USB) flash memory, or the various storage and memory devices shown in FIGS. 1 and 2, including or having stored thereon instructions which when executed by a processor or controller, carry out methods disclosed herein.

Figure 3:
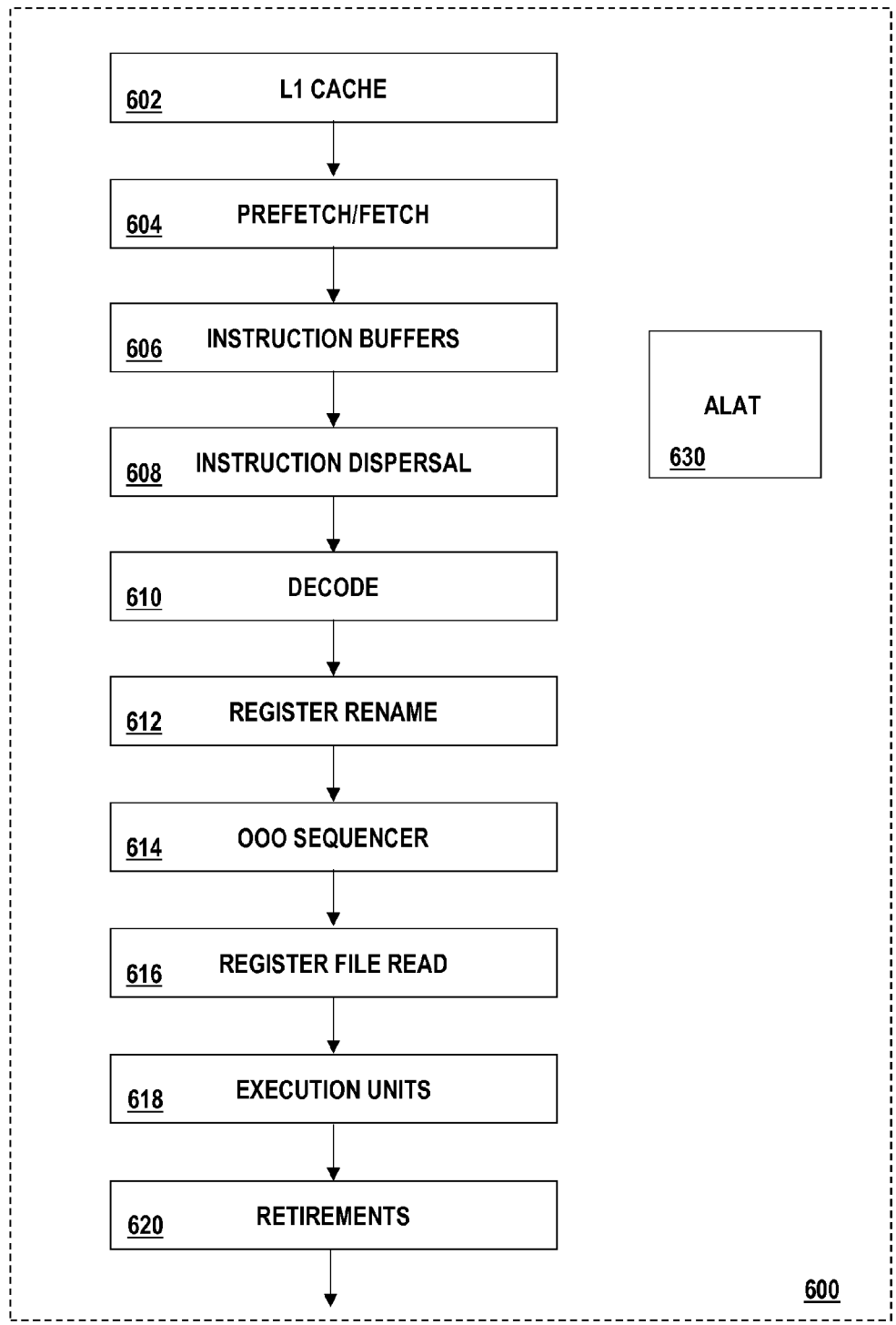
FIG. 3 is a block diagram of stages in a processor pipeline according to an embodiment of the invention.

Reference is made to FIG. 3, which is a block diagram of stages in a processor pipeline according to an embodiment of the invention. Processor pipeline 600 may be operated by the processors of FIG. 1 or 2, or other processors according to embodiments of the invention. Processor pipeline 600 may be an out-of order pipeline. Other pipeline components or mechanisms may be used.

A level one (L1) cache stage 602 may store instructions in a level one (L1) cache. A prefetch/fetch stage 604 may fetch and/or prefetch the instructions from the level one (L1) cache or another location. An instruction buffers stage 606 may temporarily keep or buffer the instructions in one or more buffers. An instruction dispersal stage 608 may send the instructions down the pipeline. A decode stage 610 may take an instruction from a program and produce one or more machine instructions. A register rename stage 612 may map logical registers over to actual physical registers prior to execution. An out-of-order (OOO) sequencer stage 614 may schedule the various machine instructions for execution, for example, based upon the availability of data, for example, in source registers. Those instructions whose source registers are waiting for data may have their execution postponed, whereas other instructions whose source registers have their data available may have their execution advanced in order. In some embodiments, they may be scheduled for execution in parallel.

A register file read stage 616 may read the physical (e.g., source) registers. An execution units stage 618 may input the machine instructions into one or more execution units. The advanced load address table (ALAT) stage 630 may modify entries while executing machine instructions, such as, advanced load instructions, corresponding test instructions, and any intervening store instructions. A retirements stage 620 may update the machine state and write to physical destination registers.

The pipeline stages shown in FIG. 3 are one example only, and may vary in both function and sequence in various processor pipeline embodiments. A processor used with embodiments of the invention need not use pipelining.

Figure 4:
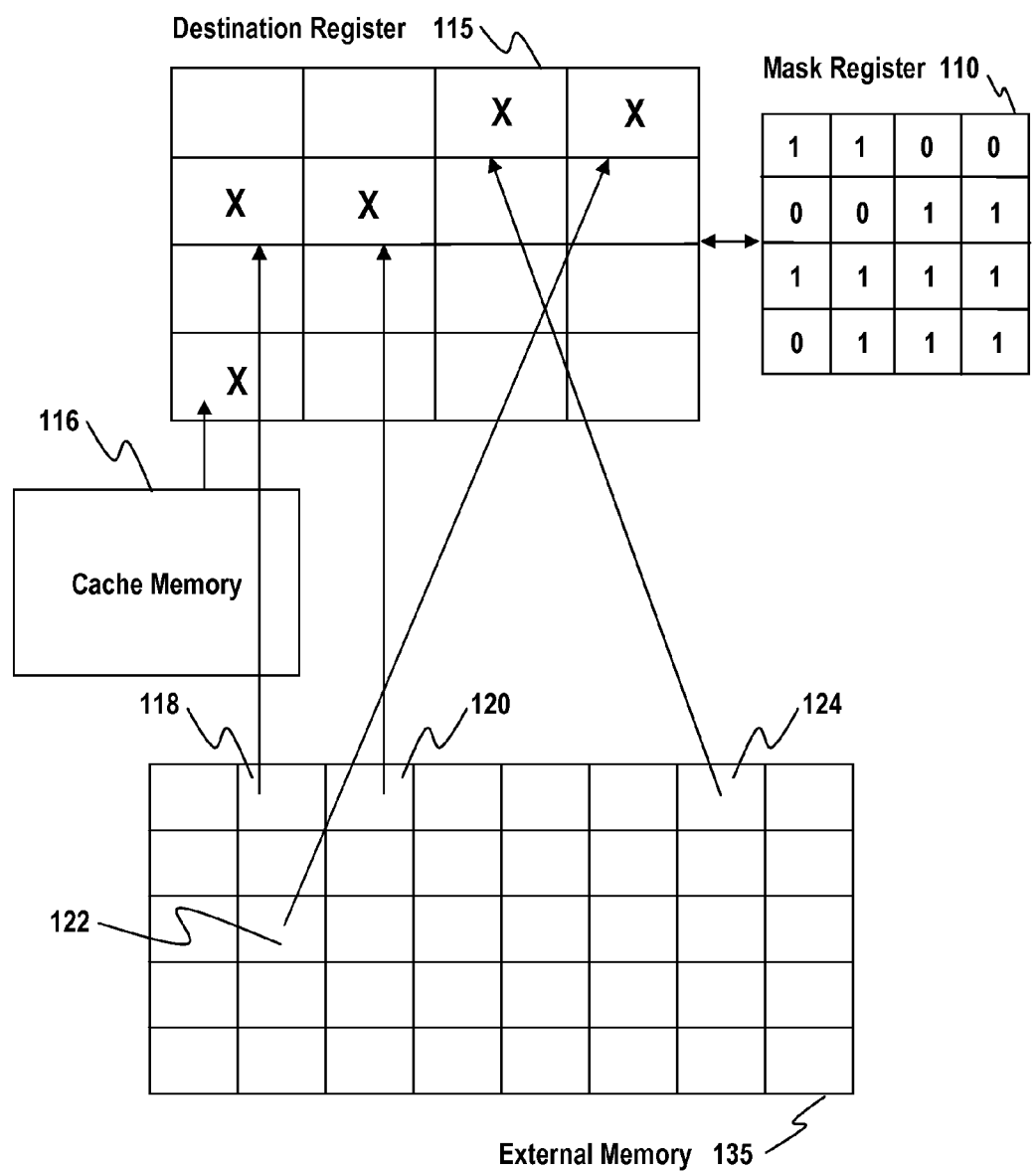
FIG. 4 is a schematic illustration of the flow of data in a system according to an embodiment of the invention.

Reference is made to FIG. 4, which schematically illustrates the flow of data in a system in accordance with an embodiment of the present invention. Data may be stored in a system (e.g., such as systems described herein in reference to FIGS. 1 and 2) in cache memory 116 and/or external memory 135. Data may be gathered from contiguous locations 118 and 120 and/or non-contiguous or non-adjacent locations 122 and 124 (e.g., in external memory 135). Cache memory 116 is typically internal to a processor and external memory 135 is typically external to a processor (e.g., processors 40, 60, 70, and/or 80, each described in reference to one of FIGS. 1 and 2). However, in various embodiments, each of cache memory 116 and/or external memory 135 may be internal or external to a processor. External memory 135 may include or be analogous to, for example, 2, 4, 10 or other memories.

Cache memory 116 and/or external memory 135 may include, for example, random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Cache memory 116 may include data duplicating original values stored elsewhere or computed earlier, where the original data may be relatively more expensive to fetch (e.g., due to longer access time) or to compute, compared to the cost of reading the cache memory 116. Cache memory 116 may include pages, memory lines, or other suitable structures. Additional or other suitable memory may be used.

A gather operation may read data from two or more of non-contiguous memory locations 122 and 124 (e.g., in external memory 135) and write the data contiguously to a register memory, such as destination register 115. The status of the gathering of the data to destination register 115 may be recorded or written to a mask register 110. Register memories (e.g., destination, mask and/or other register memories) may be relatively small storage spaces typically within a processor. The contents of register memories may be accessed more quickly than storage placed elsewhere. Destination register 115 (e.g., a load register) may be for example, a counter machine, a pointer machine, a random access machine (RAM), a random access stored program machine model (RASP) or other memories. Mask register 110 (e.g., a shadow register) may have data fields, elements, or placeholders, holding for example '0' and '1' flags or values, shadowing or tracking the state or storage capacity of destination register 115.

A gather operation may be implemented to access data elements. Due to, for example, code being ported or translated, the data elements may be dispersed (whereas the data elements may be contiguous prior to translation). Other code that is not ported (e.g., translated), for example, new code, may use the gather operations to access data. The dispersed data elements may be gathered for storing a contiguous manner or in a single location, for example, in destination register 115. In one embodiment, a gather instruction may, for example, read, copy, replicate, transfer, or contiguously write each data element from two or more non-contiguous memory locations 122 and 124 (e.g., in cache memory 116 and/or external memory 135) to destination register 115. Such processes may be referred to as "packing" the data elements and/or "packing" destination register 115. By consolidating or packing the set of data elements into a single location (e.g., destination register 115), a processor (e.g., one or more of processors 40, 60, 70, and/or 80, each described in reference to one of FIGS. 1 and 2) may load, process, monitor or otherwise use the data collectively, simultaneously, in unison, and/or in sequence for executing operations on the data in a minimal number of cycles (e.g., one cycle).

A gather operation may be interrupted, possibly because the non-contiguous data delays the progress of the operation. In some embodiments, the state of the gather operation may be saved. Thus, when the gather operation is restarted, a repeat of the entire gather operation may not be required. Storing a record of which data elements have been and have not been gathered in for example register 110, may allow a restart of the gather instruction where the gather operation was interrupted.

In some embodiments, the gather operation may gather (e.g., read or access) each of a set of (e.g., 16) data elements from two or more contiguous or non-contiguous memory locations in cache memory 116 and/or external memory 135. A gather operation may use as an input or may include a pointer to a memory page in cache memory 116. When data is spread across a boundary of a memory page, or no page memory address is provided, the gather operation may retrieve the data from external memory 135 which may take a relatively long time. In one embodiment, for each data element, the gather operation may first be pointed to cache memory 116 and if the gather is unsuccessful, may proceed to access the data from external memory 135.

The gather operation may store or pack data elements into destination register 115 (e.g., a load register). In one embodiment, destination register 115 may include multiple (e.g., 16) separate data elements, for example, used for a single gather operation. The data elements or vectors in destination register 115 may include data copied from the memory from which the data element was retrieved and/or pointers to the memory location from which the data element was retrieved. In some embodiments, the gather operation may access cache memory 116, local memory or memory internal to a processor to read or retrieve each data element before accessing external memory 135. The data elements may be arranged in cache memory 116, for example, in memory pages or other units of a memory. The data elements may be packed in memory (e.g., in contiguous memory locations 118 and 120) or alternately they may be stored in non-contiguous or non-adjacent locations (e.g., in non-contiguous memory locations 122 and 124). Typically the gather operation is used when the two or more of the data elements are stored in noncontiguous or non-adjacent memory locations 122 and 124. Data elements may be bytes (e.g., 8 bits), words (e.g., 2 bytes), double words (e.g., 32 bits) or other sizes or units of data.

The rate of a gather operation may depend on a level of coherence of the gathered elements. For example, the level of coherence of the gathered elements may be a measure of on how many different cache lines in which the data elements are stored, for example, in cache memory 116. Elements stored with greater coherence (e.g., stored using fewer cache lines in cache memory 116) may be gathered or retrieved in less time or in fewer operational cycles. For example, when all the data elements are fully coherent (e.g., on the same cache line), the gather operation may retrieve the data in a single cycle. However, gathered elements may not be fully coherent. For example, the elements may be dispersed on several (e.g., 2 or 3) cache lines, and therefore may be gathered in several (e.g., 2 or 3) accesses to (e.g., the level 1 (L1) or central processing unit (CPU)) cache memory 116.

Destination register 115 may be a vector register, load register or other register memory for temporarily storing or packing data accessed or gathered from two or more non-adjacent memory locations. For example, for a set of data (e.g., 16 vectors), destination register 115 may be the destination of a gather operation and cache memory 116 and/or external memory 135 may be the sources (e.g., which may be contiguous 118 and 120 or non-contiguous 122 and 124).

In one embodiment, when a gather operation for gathering a predetermined set of data is terminated before completion, destination register 115 may temporarily store or preserve the data already collected (e.g., a partial subset of the predetermined set of data).

The gather operation may stop or interrupt for a variety of reasons. For example, a context switching device may switch register contexts, task contexts, or process contexts (e.g., for changing a state or context of a processor between two or more of multiple tasks). In another embodiment, the gather operation may stop or interrupt when one or more precise exceptions substantially impedes or slows down the gather operation (e.g., a maximal number or limit of allowable page faults or cache page misses for an operating system (OS) may be encountered) and/or the time allotted to the gather operation expires. In yet another embodiment, the gather operation may stop or interrupt when the gather operation is replaced by a higher priority operation.

A gather operation may be impeded, for example, when attempting to retrieve data from problematic memory locations in a system resulting in page faults. Some fault conditions such as page faults must be handled so that the program flow is capable of resuming the faulting instruction (e.g., retrieving the data) while guaranteeing forward progress of a corresponding set of instructions. In one embodiment, a memory page may include a fixed length block of cache memory 116 that is used as a unit of transfer between destination register 115 and other memories, such as, external memory 135, a hard-drive or disk. A page fault may include an interrupt (e.g., or an exception), for example, when a gather operation accesses a memory page that may be mapped in address space, but not physically loaded or available in cache memory 116. For example, each data element being gathered from cache memory 116 may cause a page fault and each element that crosses a boundary of a memory page may cause two page faults.

In one embodiment, a system may stop or interrupt the gather operation, for example, when a maximal number of allowable exceptions, such as, (e.g., ≧16) page faults are encountered. For example, the OS may have a limit for cache and/or page misses or faults for an operation. The OS may include exception handling software to handle the page faults and a processor may include a memory management unit for detecting page faults. Other exception handling mechanisms may be used.

In one embodiment, when a page fault is encountered, a system may stop the gather operation in the middle in order to handle the page fault. For example, if page faults are repeatedly encountered, the gather operation may be unable to progress. Conventionally, when the gather operation is stopped or interrupted, a partial subset of data elements already gathered may be lost and the process may rollback or return to the beginning of the gather operation.

Storing data gathered from cache memory 116 and/or external memory 135 in destination register 115 may preserve the data, for example, in case the complete gather operation (e.g., gathering all 16 vectors) is interrupted, fails or terminates before completion. According to embodiments of the invention, by storing data elements that have been gathered in destination register 115, the data previously collected by an interrupted or stopped gather operation may be preserved and the gather operation may restart in the middle. The interrupted gather operation (e.g., having gathered one or more data elements) may start from the middle, for example, gathering the remaining elements missing from destination register 115.

An efficient gather operation may be implemented in a system using a combination of software and/or hardware mechanisms. In one embodiment, a processor may execute a "gather_step" instruction repeatedly, for example, until a predetermined set of data has been completely gathered into destination vector register memory 115.

In some embodiments, mask register 110 may be implemented to monitor and/or control the gathering of a predetermined set of data elements and the packing of destination register 115 therewith. Mask register 110 may be a shadow register, a control register, a flag register or other appropriate register. Mask register 110 may track the completion of the gather operation by monitoring the data stored in destination register 115. In one embodiment, there is a one-to-one correspondence between data elements stored in destination register 115 and corresponding state elements stored in mask register 110. State elements or values may include flags, markers, tabs, indicators, signals, and or other numbers, bits and/or codes for indicating whether of not a corresponding data element (e.g., in a corresponding or pointed register location) is stored in destination register 115. For example, a "1" in mask register 110 may indicate that a corresponding data element was not written into destination register 115; otherwise a "0" may be used. Other numbers or flags may be used.

In one embodiment, a processor may call or execute the gather step instruction, for example, in a 'while' loop or repeating 'if' statement, until mask register 110 may be completely cleared (e.g., all state elements therein holding '0' values and the total value of mask register 110 may become zero), which may indicate that substantially all elements were successfully gathered from memory and loaded into destination register 115. In one embodiment, the gather step instruction may execute or run until the total value of the register state elements is zero.

Since a filled or packed destination register 115 of any size (e.g., for any number of gathered elements or instructions) may correspond to an empty or zero mask register 110 (e.g., regardless of the size of destination register 115), mask register 110 may be used to monitor the packing of any size destination register 115 (e.g., with any number of gathered elements). For example, the total sum of any number of "0" state elements will always be zero. Thus, mask register 110 may be used to monitor the packing or gathering of any, variable, and/or changing numbers of data elements into destination register 115. Other values may be used.

For example, in an alternate embodiment, a "1" in mask register 110 may indicate that a corresponding data element is written into destination register 115; otherwise a "0" may be used. In such embodiments, the gather instruction may execute until the sum of the values of the state elements in mask register 110 is equal to a predetermined threshold, for example, the number of data elements to be gathered, which may vary for each gather instruction.

In one embodiment, the gather step instruction may execute or run until a flag indicates that mask register 110 is cleared, zero, or another predetermined value (e.g., the number of elements to be gathered for the gather instruction). In one embodiment, a completion mask may signal or flag when the gather operation is complete.

In one embodiment, in each operation cycle, the "gather_step" instruction may read a different one of the cache lines from (e.g., L1) cache memory 116 and may fill a maximum number of elements in destination register 115 corresponding to the cache line read. For example, if the cache line read has one element to be gathered, then one element may be written into destination register 115 and the corresponding one bit state elements in mask register 110 may be set to "0". In some embodiments, when dual or multiple ported cache memory 116 and/or external memory 135 are used, a processor may gather more than 1 data element per cycle, in which case the gather operation for gathering a predetermined set of data elements may execute in fewer cycles or iterations.

The following pseudo-code includes demonstrative examples of operations described herein. Other pseudo-code, languages, operations, orders of operations, and/or numbers may be used.

The following pseudo-code illustrates an example of how a gather instruction (e.g., written 'vgatherd') may operate.

Define a vgatherd instruction as follows:

```
vgatherd vector_dest{mask}, vector_offset, [base_address]
vector_dest is a vector register containing the result
mask is a 16-bit mask register used to track the progress of the
vector-gather operation
base_address is the base memory address
vector_offset is a vector register that contains a vector of offsets
from the base_address
    // Initialize the array of addresses
    for(i=0; i < 16 ; i++)
    {
      memPtr[i] = base_address + vector_offset[i];
    }
    bool bFirst = 1;
    UINT64 BaseCacheLine = 0;
    for(i=0; i < 16 ; i++)
    {
      if (mask[i] == 1)
      {
        thisCacheLine = memPtr[i] & 0xffffffffffffffC0;
        if( bFirst || (BaseCacheLine == thisCacheLine ))
        {
          BaseCacheLine = thisCacheLine;
          bFirst = 0;
          vector_dest[i] = LOAD_FROM_MEMORY(memPtr[i]);
          // 32-bits
          // reset mask bit
          mask[i] = 0;
        }
      }
    }
```

The following assembly code illustrates an example of how to use an iterative gather-step instruction (vgatherd) to implement a full vector-gather function, according to one embodiment.

The (vkxnor k1, k2) instruction implements the following function:

k1=k1 XNOR k2

The (vkortest k1, k2) instruction writes the integer flags as follows.

```
zero_flag = ((k1 OR k2) == 0) // is the "or" of k1 and k2 equal to zero
carry_flag = ((k1 OR k2) == 0xFFFF) // is the "or" of k1 and k2
equal to all 1's
The "jnz" instruction is a standard x86 jump-if-not-zero branch.
;-------------------------------------------------------------------
; K1 = ffff;
        vkxnor k1, k1       ; init the completion mask
vg_loop:
        vgatherd v1{k1}, v2, [eax]    ; v1 = dest
                                      ; k1 = completion mask
                                      ; v2 = address offset vector
                                      ; eax = base address
        vkortest k1, k1
        jnz vg_loop
```

The following pseudo-code illustrates one embodiment of a scatter instruction (written here 'vscatterd').
Define a vscatterd instruction as follows:

```
vscatterd [base_address]{mask}, vector_offset, vector_scatter_data
base_address is the base memory address
mask is a 16-bit mask register used to track the progress of the
vector-gather operation
vector_offset is a vector register that contains a
vector of offsets from the base_address
vector_scatter_dest is a vector register containing the
data that is to be scattered to memory
    // Initialize the array of addresses
    for(i=0; i < 16 ; i++)
    {
      memPtr[i] = base_address + vector_offset[i];
    }
    bool bFirst = 1;
    UINT64 BaseCacheLine = 0;
    for(i=0; i < 16 ; i++)
    {
      If (mask[i] == 1)
      {
        UINT64 thisCacheLine = memPtr[i] & 0xffffffffffffffC0;
        if( bFirst || (BaseCacheLine == thisCacheLine ))
        {
          BaseCacheLine = thisCacheLine;
          bFirst = 0;
          // Store to memory 32 bits of vector_scatter_data[i]
          to location memPtr[i]
          STORE_TO_MEMORY(memPtr[i],vector_scatter_data[i]);
          // reset mask bit
          mask[i] = 0;
        }
      }
    }
```

The following assembly code illustrates one example an iterative scatter-step instruction (vscatterd) implementing a full vector-scatter function.

```
;-------------------------------------------------------------------
vs_loop:
        vscatterd [eax]{k1}, v2, v3    ; v3 = vector of scatter data
                                       ; k1 = completion mask
                                       ; v2 = address offset vector
                                       ; eax = base address
        vkortest k7, k7
        jnz vs_loop
```

A scatter/gather prefetch instruction may be defined similarly to the vgatherd instruction, but instead of loading data into destination register 115, the cache line having the data may be prefetched into cache memory 116. In one embodiment, the data may first be prefetched into cache memory 116, for example, before being gathered, in order to avoid paying a cache miss penalty. Such an order of operations may be achieved, for example, by executing the following instruction:

```
vgatherpfd vector_offset{mask}, [base_address]
mask may be a 16-bit mask register used to track the progress of the
vector-gather operation
base_address may be the base memory address
vector_offset may be a vector register that contains a vector of offsets
from the base_address
```

Following is one example or sample of pseudo-code for a prefetch loop:
The vgatherpfd may prefetch the data into the L1 cache each iteration.

```
; K1 = ffff;
        vkxnor k1, k1       ; init the completion mask
vpref_loop:
        ; prefetch the cacheline associated with the first non-gathered
        element
        vgatherpfd   v2{k1}, [eax]
        vkortest k1, k1
        jnz vpref_loop
```

Embodiments of the invention may include gather and/or scatter operations that use mask register 110 as a writemask (e.g., selecting the data elements on which to operate) and completion mask (e.g., signaling or flagging when the operation may be complete). In one embodiment, the writemask and/or vector completion mask may be (e.g., 16 bit) registers in a register file. Such embodiments may enable varied and/or flexible implementations on different architectures with varying levels of performance that may be customized for a target application. For example, some wide vector architectures may implement gather and/or scatter operations in which all elements are gathered and/or scattered in a single cycle. In other implementations may gather and/or scatter only one element per cycle. The order of instructions for executing the gather and/or scatter operations may affect the number of cycles used to access cache memory 116 to scatter and/or gather elements. Embodiments of the invention may use addresses that may be built using scaled index bias addressing, which may allow, for example, for 64-bit address generation from a vector having a 32-bit offsets. Compared with some conventional architectures, which use a vector of completely formed addresses, the scaled addressing may be generated using reduced programming overhead. Addressing modes may be formed using a (e.g., 64-bit) memory pointer using elements from two vector registers and/or neighboring elements in one vector register. Other or different memory pointing or addressing mechanisms may be used.

Embodiments of the invention may include gather and/or scatter operations that support a wide variety of data type conversions. Such support may be valuable when considering the spatial coherency of data and the total number of cache lookups used to complete a scatter and/or gather operation. Other or different benefits may be achieved.

Figure 5:
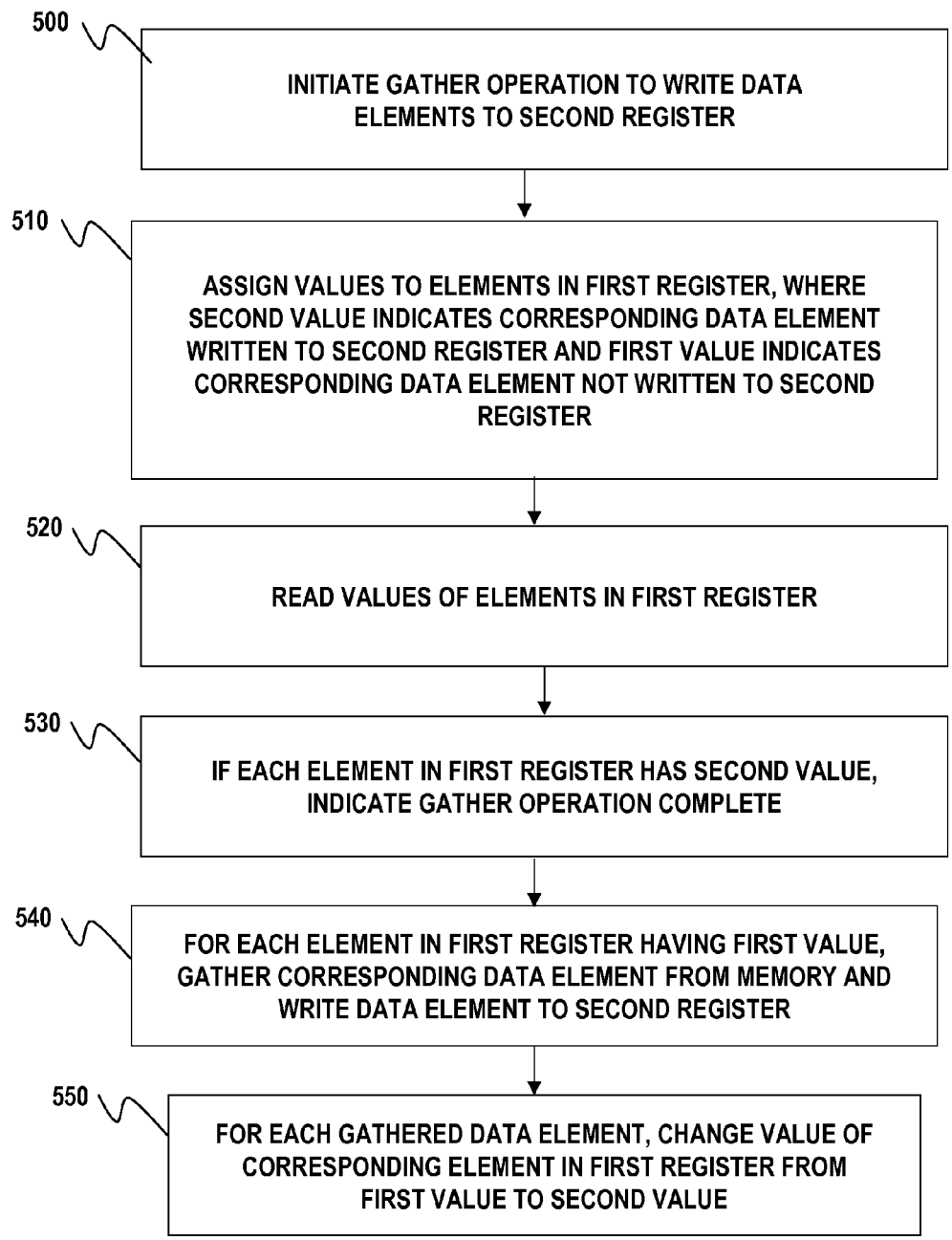
FIG. 5 is a flow chart of a method according to an embodiment of the invention.

Reference is made to FIG. 5, which is a flow chart of a method according to an embodiment of the invention.

In operation 500, a processor (e.g., processor 40 and 60, described in reference to FIG. 1 and processor 70 and 80, described in reference to FIG. 2) may call or initiate a gather operation or instruction, or restart such an operation, to write a set of data elements (e.g., or data elements in a predetermined set of data), and/or pointers thereto, stored for example in two or more noncontiguous memory locations (e.g., memory locations 122 and 124, described in reference to FIG. 4), to a second register.

In operation 510, the processor may assign values to elements in a first (e.g., a mask) register, which may in some cases monitor the storage capacity of the second register. In some embodiments, each element in the first register may correspond to a respective one of the data elements to be written into the second (e.g., load) register. There may be a one-to-one correspondence between data fields in the first register and data elements in the second register. A first value may indicate that the corresponding data element has been written into the second register and a second value may indicate that the corresponding element has not been written into the second register. The first value may be zero (0) and the second value may be one (1). In another embodiment, the first value may be one (1) and the second value may be zero (0). Other or different values may be used.

In some embodiments, each zero value of an element (e.g., a state element) in a mask register may indicate that the corresponding data element has not been written to a load register and each nonzero value of the state element in the mask register may indicate that the corresponding data element has not been written to the load register.

In operation 520, the processor may read the values of each of the elements in the first register.

In operation 530, if each element in the first register has the first value, the first register may indicate (e.g., using a flag or signal) that a gather operation for writing each corresponding data element into the second register is complete. For example, the processor may complete the gather operation if the first register indicates that all data elements have been written into the second register. In one embodiment, the processor may sum each of the values of each of the elements in the first register, and if the sum is equal to a predetermined threshold (e.g., zero (0)), the first register may indicate that a gather operation is complete. In one embodiment, a predetermined threshold of zero may be used for the first register to monitor the storage capacity of the second register of any size, or the progress of a gather operation. For example, writing or gathering may stop when all elements of the first register are zero, the sum of the elements of the first register is zero, and/or the first register is empty.

In operation 540, for each element in the first memory having the second value, the processor may gather the corresponding data element from memory and write the data element into the second register. In one embodiment, for each element in the first register having a second value, the processor may write a maximal number of data elements to be gathered from a memory location (e.g., a cache line) to the second register. For example, for each nonzero state element, if a cache line holding the corresponding data element comprises a second data element to be gathered (e.g., from the predetermined set), the processor may write the second data element to the load register. In some embodiments, when a page fault occurs, the processor may read a data element from external memory.

In some embodiments, for each element in a mask register having a nonzero value read (e.g., in operation 520), the processor may write each of the corresponding data elements from memory to a load register until the total value (e.g., the sum of values of each element) of the mask register is zero.

In operation 550, for each gathered data element, the processor may change the value of the corresponding element in the first register from the second value to the first value.

Other operations or series of operations may be used.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
assigning values to data fields in a first register, wherein each data field in the first register corresponds to a data element to be written into a second register, wherein for each data field in the first register, a first value indicates the corresponding data element has not been written into the second register and a second value indicates that the corresponding data element has been written into the second register, wherein the corresponding data elements include pointers to two or more noncontiguous memory locations;
reading the values of each of the data fields in the first register; and
for each data field in the first register having the first value, gathering the corresponding data element and writing the corresponding data element into the second register and changing the value of the data field in the first register from the first value to the second value.

2. The method of claim 1, wherein if each data field in the first register has the second value, indicating that a gather operation for writing each corresponding data element into the second register is complete.

3. The method of claim 2, comprising completing the gather operation if the first register indicates that all data elements have been written into the second register.

4. The method of claim 1, wherein the first register monitors the storage capacity of the second register.

5. The method of claim 1, wherein the first value is zero and the second value is one.

6. The method of claim 1, wherein the first value is one.

7. The method of claim 1, comprising summing the values of each of the data fields in the first register; and if the sum is equal to a predetermined threshold, indicating that a gather operation for writing each corresponding data element into the second register is complete.

8. A method comprising:
reading from a first register the values of state elements, each of which corresponds to one of a plurality of data elements in a predetermined set of data, wherein each zero value of a state element indicates that the corresponding data element has been written to a load register and each nonzero value of a state element indicates that the corresponding data element has not been written to the load register;
for each state element having a nonzero value, writing each of the corresponding data elements from a memory to the load register; and adding the state elements of the first register to compute the total value of the first register.

9. The method of claim 8, wherein writing is stopped when the first register contains the value zero for all elements in the predetermined set of data.

10. The method of claim 8, wherein there is a one-to-one correspondence between data elements to be written to the load register and corresponding state elements in the first register.

11. The method of claim 8, wherein the data elements in the predetermined set of data comprise pointers to two or more noncontiguous memory locations.

12. The method of claim 8, comprising for each nonzero state element, if a cache line holding the corresponding data element comprises a second data element from the predetermined set, writing the second data element to the load register.

13. A system comprising:
   a first register comprising data fields, wherein each data field in the first register corresponds to a data element to be written into a second register, wherein for each data field in the first register, a first value indicates the corresponding element has not been written into the second register and a second value indicates that the corresponding data element has been written into the second register; and
   a processor to:
      read the values of each of the data fields in the first register;
      for each data field in the first register having the first value, gather the corresponding data element, write the corresponding data element into the second register, and change the value of the data field in the first register from the first value to the second value; and
      sum the values of each of the data fields in the first register; and if the sum is equal to a predetermined threshold, the first register is to indicate that a gather operation for writing each corresponding data element into the second register is complete.

14. The system of claim 13, wherein if each data field in the first register has the second value, the processor is to indicate that a gather operation for writing each corresponding data element into the second register is complete.

15. The system of claim 14 wherein the processor is to complete the gather operation if the first register indicates that all data elements have been written into the second register.

16. The system of claim 13, wherein the first register is to monitor the storage capacity of the second register.

17. The system of claim 13, wherein the first value is zero and the second value is one.

* * * * *